United States Patent
Shih et al.

(10) Patent No.: US 7,464,257 B2
(45) Date of Patent: Dec. 9, 2008

(54) MIS-CONFIGURATION DETECTION METHODS AND DEVICES FOR BLADE SYSTEMS

(75) Inventors: Ching-Chih Shih, Tao Yuan Shien (TW); Li-Tsung Chen, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 550 days.

(21) Appl. No.: 11/231,154

(22) Filed: Sep. 20, 2005

(65) Prior Publication Data

US 2006/0281368 A1 Dec. 14, 2006

(30) Foreign Application Priority Data

Jun. 13, 2005 (TW) ............................. 94119476 A

(51) Int. Cl.
*G06F 15/177* (2006.01)

(52) U.S. Cl. .......................................... 713/1; 713/100

(58) Field of Classification Search ....................... None
See application file for complete search history.

(56) References Cited

U.S. PATENT DOCUMENTS

| 6,973,517 | B1 * | 12/2005 | Golden et al. ............... 710/104 |
| 7,363,392 | B2 * | 4/2008 | Thomas ........................ 710/8 |
| 2003/0226004 | A1 * | 12/2003 | Abbondanzio et al. ......... 713/1 |
| 2008/0046708 | A1 * | 2/2008 | Fitzgerald et al. .............. 713/2 |

* cited by examiner

*Primary Examiner*—Dennis M Butler
(74) *Attorney, Agent, or Firm*—Thomas, Kayden, Horstemeyer & Risley

(57) ABSTRACT

A mis-configuration detection method for a blade system. A blade system comprising a plurality of blade servers, a first Input/Output (I/O) module, a second I/O module, and a management module is provided, each blade server comprising a daughter card (DC). The management module determines a first candidate I/O type according to a DC type and activates the blade servers, or executes DC mis-configuration operations, determines a second candidate I/O type according to the DC type and activates the first I/O module, or executes an I/O mis-configuration operation, and activates the second I/O module according to the type of the first I/O module, or executes I/O mis-configuration operations.

15 Claims, 6 Drawing Sheets

MIS-CONFIGURATION DETECTION METHODS AND DEVICES FOR BLADE SYSTEMS

BACKGROUND

The invention relates to detection methods, and more particularly, to mis-configuration detection methods for blade systems.

Integration of internal servers in a central location reduces problems and costs associated with distributed small-scale servers.

Currently, entity integration has replaced pedestal servers with single rack unit (RU) or double RU servers, saving space and easing administration. Each server requires independent components, such as power supply cables, Ethernet interfaces, system management, power supplies, keyboard/video/mouse (KVM) interfaces, optical fiber interfaces, and others. When a 42U height cabinet is filled with servers, a numerous cables are required therein such that problems may not be rapidly solved and server installation and replacement inconvenience. Additionally, multiple occupy independent power supplies and converter units occupy major space.

To solve the above-described problems, blade systems have been disclosed. Unlike pedestal or rack mount servers, the volume of each installed blade server is much smaller, despite comprising a central processing unit (CPU), a hard disk drive (HDD), memory, network interfaces, control chips, and others, as a pedestal or rack mount server. Further, each blade server acts as an interface card in a personal computer, juxtaposed in a blade system. FIG. 1 is schematic view of a blade system. Blade system 100 comprises multiple (ten, here) parallel blade servers 110. Blade servers 110, remotely monitored by a management module 150, share a power supply 120, a fan 130, a switch 140, a mouse (not shown), a keyboard (not shown), and a display device (not shown).

Generally, each blade server comprises four I/O bays, each comprising an I/O module for networking. Additionally, each blade server comprises a daughter card (DC) 115 for connection to the I/O module. When different types of DCs are installed or the DC type for blade servers is different from the I/O module type, the blade servers or I/O module cannot effectively operate.

Thus, a mis-configuration detection method for blade systems is required, generating notification to avoid erroneous DC types for I/O modules and blade servers.

SUMMARY

Mis-configuration detection methods for blade systems are provided. In an embodiment of such a method, a blade system, comprising a plurality of blade servers, a first Input/Output (I/O) module, a second I/O module, and a first management module, is provided. Each blade server comprises a daughter card (DC). When the blade system is activated, the first management module determines whether installed DC types are the same. If so, the first management module designates the DC type a first candidate I/O type and activates the blade servers, and, if not, executes DC mis-configuration operations. The first management module determines whether the first I/O module type is identical to the first candidate I/O type, and, if so, designates the first I/O module type a second candidate I/O type and activates the first I/O module, and, if not, executes I/O module mis-configuration operations.

Further, the first management module determines whether the second I/O module type is identical to the second candidate I/O type, and, if so, activates the second I/O module, and, if not, executes I/O module mis-configuration operations.

Further, when the blade servers are inactive, the first management module determines whether each DC type is the same, and, if so, designates the DC type a third candidate I/O type and activates the blade servers, and, if not, executes chassis mis-configuration operations. The first management module determines whether the first I/O module type is identical to the third candidate I/O type, and, if so, designates the first I/O module type a fourth candidate I/O type and activates the first I/O module, and, if not, executes I/O module mis-configuration operations.

Also disclosed is another mis-configuration detection method for blade systems. In an embodiment of such a method, a blade system, comprising a first slot, a second slot, and blade servers not comprising DCs, is provided. No I/O module is inserted in the first and second slots. When a first I/O module is inserted in the first slot, the first I/O module type is designated as a first candidate I/O type and the first I/O module is activated.

Further, when a second I/O module is inserted in the second slot and no I/O module is inserted in the first slot, I/O module mis-configuration operations are executed.

Further, when a blade server comprising a DC is installed on the blade server, the DC type is designated as a second candidate I/O type and the blade server is activated.

Further disclosed is another mis-configuration detection method for blade systems. In an embodiment of such a method, a blade system, comprising a plurality of blade servers comprising different types of DCs, is provided, and chassis mis-configuration is detected. An I/O module is inserted in the blade system and the I/O module type is designated as a candidate I/O type. The I/O module is activated. It is determined whether the I/O module type is identical to one DC type, and, if so, blade servers comprising DCs with the types identical to the I/O module type are activated, and, if not, the chassis mis-configuration is detected.

Mis-configuration detection devices for blade systems are provided. An embodiment of such a device comprises a plurality of blade servers, a first I/O module, a second I/O module and a first management module, each blade server comprising a DC. When an initial operation is implemented, the first management module determines whether each installed DC type is the same, and, if so, designates the DC type a first candidate I/O type and activates the blade servers, and, if not, executes DC mis-configuration operations. The first management module then determines whether the first I/O module type is identical to the first candidate I/O type, and, if so, designates the first I/O module type a second candidate I/O type and activates the first I/O module, and, if not, executes I/O module mis-configuration operations.

BRIEF DESCRIPTION OF THE DRAWINGS

The invention can be more fully understood by reading the subsequent detailed description and examples of embodiments thereof with reference made to the accompanying drawings, wherein.

DETAILED DESCRIPTION

The invention discloses a mis-configuration detection method and device for blade systems.

Figure 1:
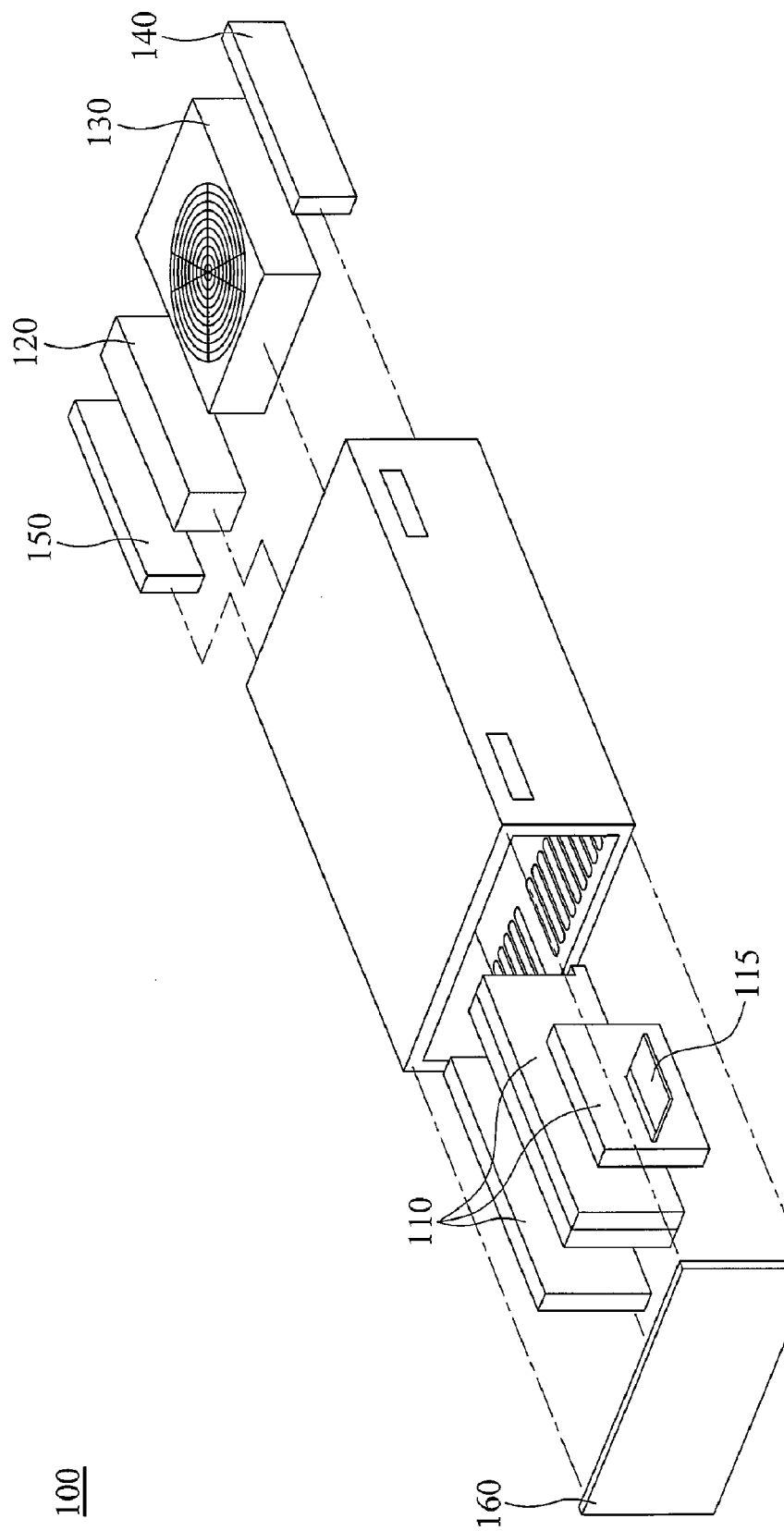
FIG. 1 is a schematic view of a blade system.
Figure 2:
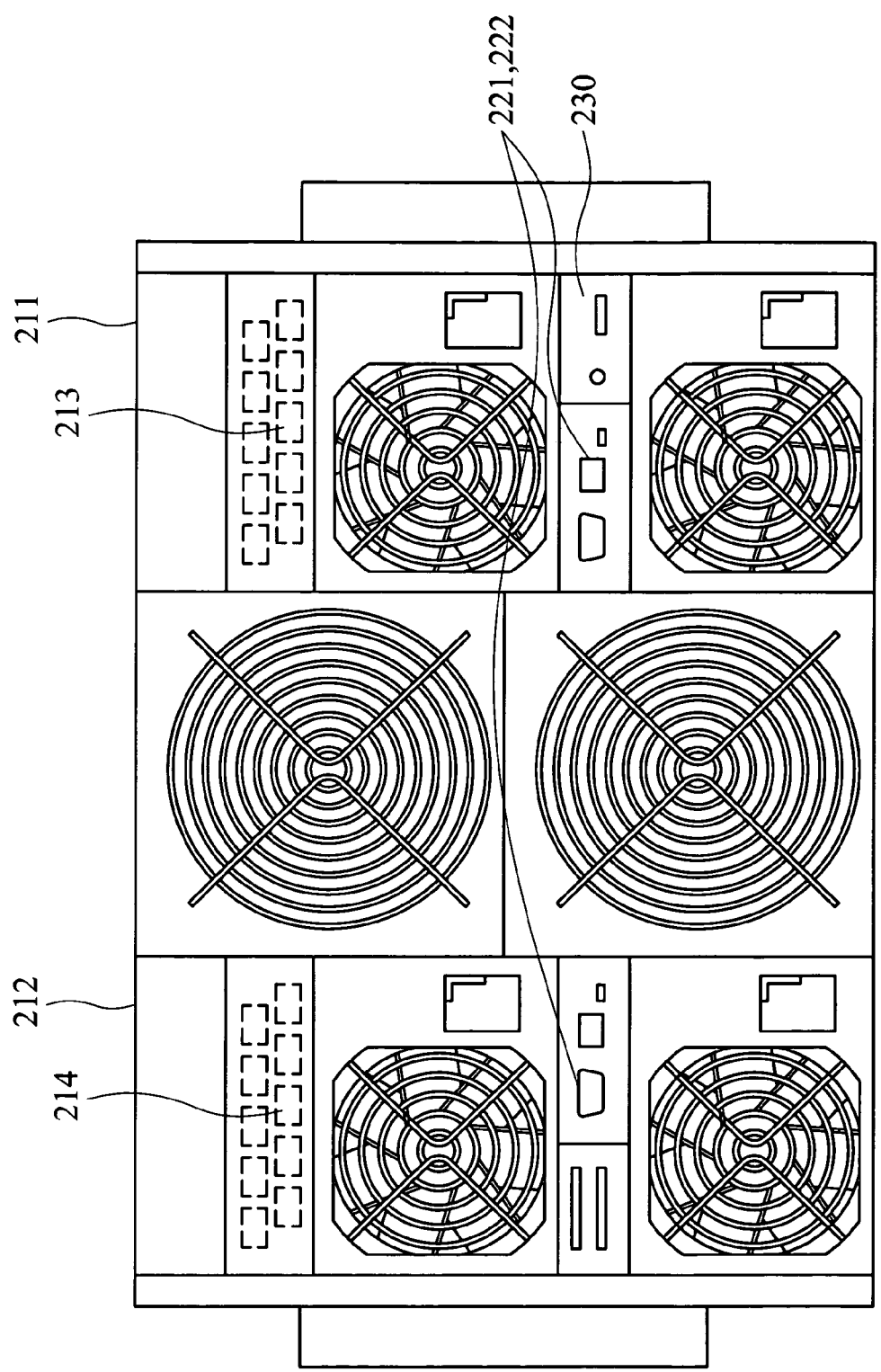
FIG. 2 is a schematic view of an embodiment of the architecture of a blade system.

FIG. 2 is a schematic view of an embodiment of the architecture of a blade system. Blade system 200 comprises four I/O bays 211~214, a master baseboard management controller (BMC) 221, a slave BMC 222, a KVM module 230 and multiple blade servers (not shown). An I/O module for networking can be inserted in each of I/O bays 211~214.

In this embodiment, an I/O module is a Gigabit Ethernet (GbE) switch (SW) module, a Fiber Channel Pass Through (FC-PT) module, a Dell Power Connect GbE module, a Dell Physical (PHY) module, a Fiber Channel Switch (FC-SW) module, or an Infinite Band Pass Through (IB-PT) module.

Hardware or software components can comprises BMCs, DCs, Fiber Channel (FC) modules, Field Replaceable Units (FRU), KVM interfaces, modular management blades (MMB), and PHY networking devices.

A BMC installed on a server blade provides intelligent platform management interfaces (IPMI), capable of embedded function, multiple interfaces, and considerable general purpose I/O (GPIO) pins.

A DC acts as a protocol control information (PCI) card installed on a pedestal or rack mount server, installed on a blade server, providing PCI-X or PCI-Express function.

An FC module, operating at 2.215 gigabits/sec, is a data transmission interface supporting multiple transmission protocols, comprising interface protocol (IP) and small computer system interface (SCSI), capable of integration with high-speed I/O and networking of single connection. FC is an open standard, defined in American National Standards Institute (ANSI) and Open System Interconnection (OSI); standards, applicable to copper and fiber transmission with an available distance of 10 kilometers.

An FRU is a removable or replaceable hardware component, such as electrically erasable programmable read only memory (EEPROM). Typical switch FRUs record switch typs, product names, and media access control (MAC). Chassis FRUs record chassis or MMB configuration.

A KVM module controls through a PS2 keyboard and mouse and VGA signals. Output for controlled blade servers is switched to a KVM circuit board and an MMB controls and manages the blade servers using corresponding KVM control circuits.

An MMB manages blades and chassis and provides an embedded network server and services for management.

A PHY networking device is an Ethernet transmissive module, routing data signals from blade servers to an external networking device. The transmissive module connects to blade servers one-to-one, or a single RU server to an external network device.

A mis-configuration detection method for blade systems of the invention comprises a two-phase process, first powering on the chassis with direct current and MMB activation or state change from master to slave. The second phase comprises removal or insertion of I/O modules, removing blade servers comprising DCs, and inserting blade servers not comprising any DCs.

Next, DC types and I/O module types are defined according to the described network modules, as follows.

Type 1: GbE Module

|  | Learning | Type |
| --- | --- | --- |
| Candidate I/O Type | Learn from blade with DC | Gbe |
| I/O Fabric Type | Learn from blade with DC | Gbe |
| Model of I/O Module | Not Yet | Unknown |

Type 2: GbE-SW-Module

|  | Learning | Type |
| --- | --- | --- |
| Candidate I/O Type | Learn from blade with I/O module | Gbe-SW |
| I/O Fabric Type | Learn from blade with I/O module | Gbe |
| Model of I/O Module | Learn from blade with I/O module | SW |

Type 3: GbE-PHY Module

|  | Learning | Type |
| --- | --- | --- |
| Candidate I/O Type | Learn from blade with I/O module | Gbe-SW |
| I/O Fabric Type | Learn from blade with I/O module | Gbe |
| Model of I/O Module | Learn from blade with I/O module | SW |

Type 4: FC Module

|  | Learning | Type |
| --- | --- | --- |
| Candidate I/O Type | Learn from blade with DC | FC |
| I/O Fabric Type | Learn from blade with DC | FC |
| Model of I/O Module | Not Yet | Unknown |

Type 5: FC-SW Module

|  | Learning | Type |
| --- | --- | --- |
| Candidate I/O Type | Learn from blade with I/O module | FC-SW |
| I/O Fabric Type | Learn from blade with I/O module | FC |
| Model of I/O Module | Learn from blade with I/O module | SW |

Type 6: FC-PT Module

|  | Learning | Type |
| --- | --- | --- |
| Candidate I/O Type | Learn from blade with I/O module | FC-PT |
| I/O Fabric Type | Learn from blade with I/O module | FC |
| Model of I/O Module | Learn from blade with I/O module | PT |

Type 7: IB Module

|  | Learning | Type |
|---|---|---|
| Candidate I/O Type | Learn from blade with DC | IB |
| I/O Fabric Type | Learn from blade with DC | IB |
| Model of I/O Module | Not Yet | Unknown |

Type 8: IB-SW Module

|  | Learning | Type |
|---|---|---|
| Candidate I/O Type | Learn from blade with I/O module | IB-SW |
| I/O Fabric Type | Learn from blade with I/O module | IB |
| Model of I/O Module | Learn from blade with I/O module | SW |

Type 9: IB-PT Module

|  | Learning | Type |
|---|---|---|
| Candidate I/O Type | Learn from blade with I/O module | IB-PT |
| I/O Fabric Type | Learn from blade with I/O module | IB |
| Model of I/O Module | Learn from blade with I/O module | PT |

Mis-configuration operations correspond to I/O module mis-configuration, DC mis-configuration, or chassis mis-configuration. I/O module mis-configuration operations comprise unallowable activation for the I/O modules, blinking pilot lamp (LED) for the I/O modules, blinking pilot lamp (LED) for chassis of the blade servers, and generation of MMB logs. DC mis-configuration operations comprise unallowable activation for the blade servers, blinking pilot lamp (LED) for the blade servers, generation of MMB logs, and blinking. KVM pilot lamp (LED) du ring activation for the blade servers and generation of error messages. Chassis mis-configuration operations comprise blinking pilot tamp (LED) for chassis of the blade servers and implementation of DC mis-configuration operations for all blade servers comprising a DC.

A mis-configuration detection method for blade systems is implemented according to definitions and mis-configuration types.

Figure 3A:
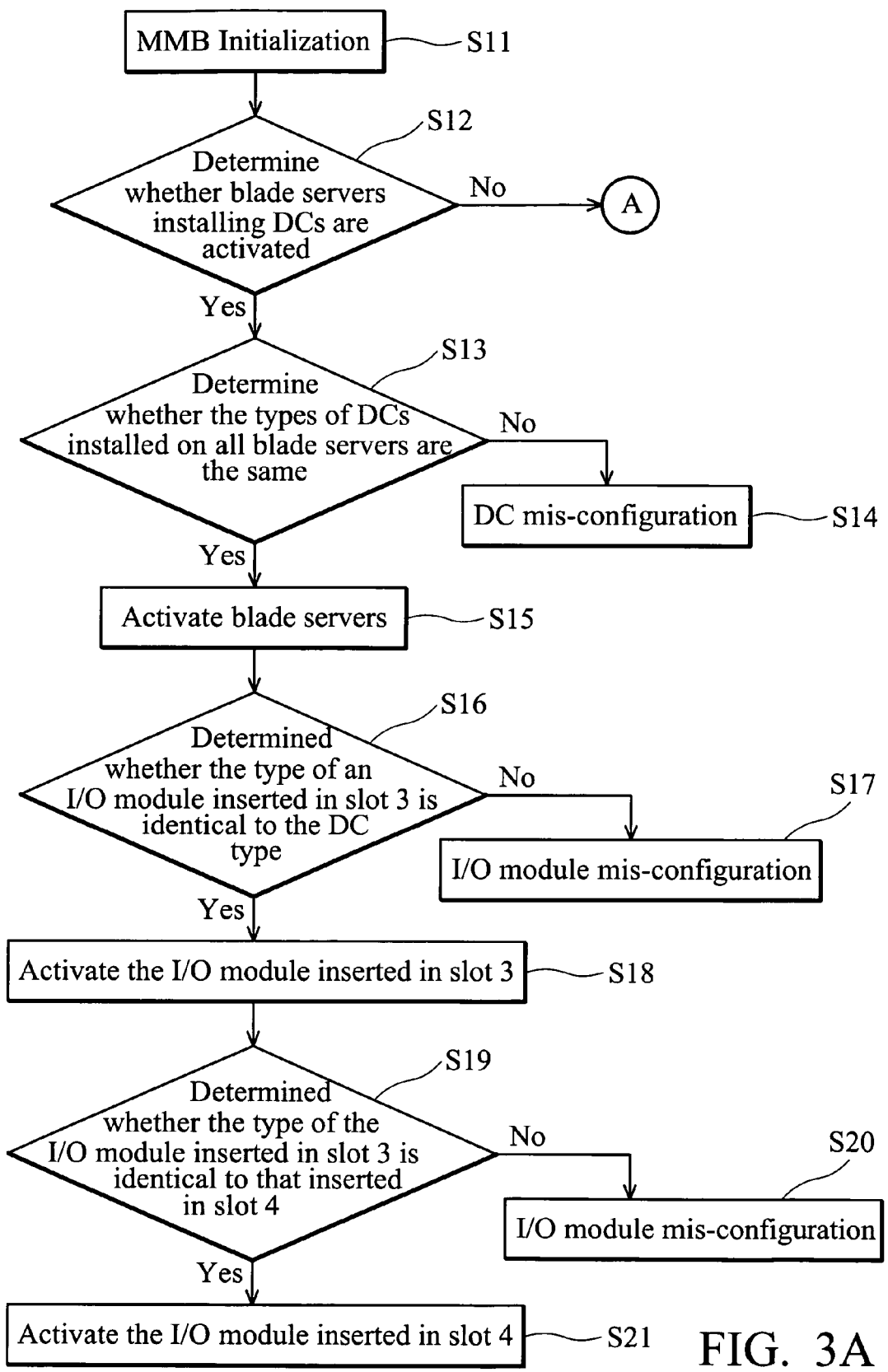
FIGS. 3A and 3B are flowcharts of an embodiment of a mis-configuration detection method for blade systems.
Figure 3B:
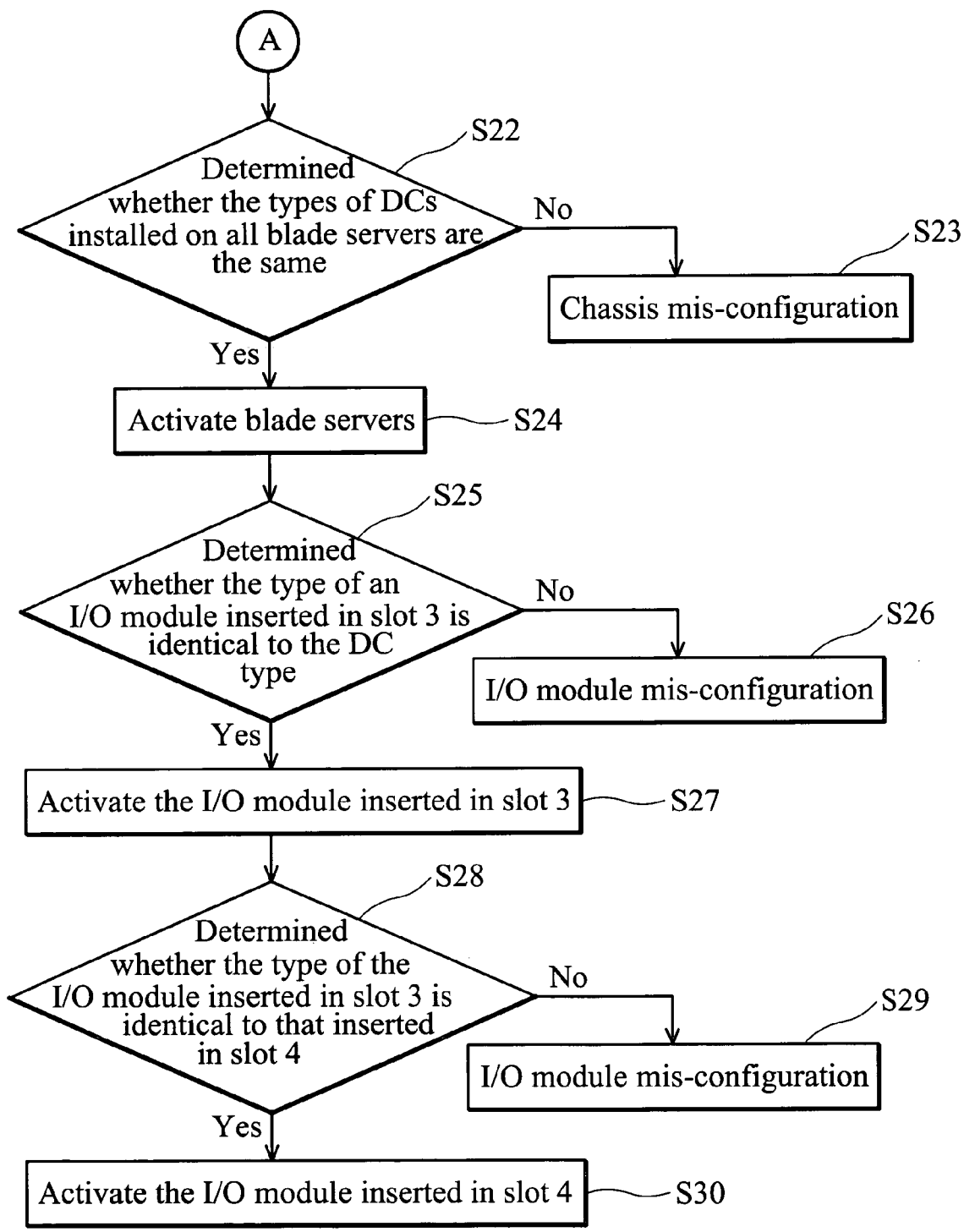

FIGS. 3A and 3B are flowcharts of an embodiment of a mis-configuration detection method for blade systems.

Referring to FIG. 3A, when a blade system is powered on, a MMB executes initial processes, waiting for 30 seconds to confirm that all I/O modules and blade servers are initialized (step S11). Information is obtained during the initial processes, comprising I/O module type information obtained by FRU, power consumption information obtained from the Intelligent Platform Management Bus (IPMB), and DC information for all blade servers obtained from IPMB. Additionally, when the MMB (master) is re-activated (i.e. the blade system re-activated) or changes to the slave state (i.e. the master MMB failing due to damages or other causes), step S11 is executed.

Next, it is determined whether blade servers comprising DCs are activated (step S12), and; if so, the process goes to step S13, and, if not, to step S22 (as shown in FIG. 3B). When all blade servers comprising DCs are activated, information of the DC type thereof (such as Gbe, FC, or TB) is obtained and the DC type is designated as a candidate I/O type. Next, it is sequentially determined, from the first position, whether the types of DCs installed on all blade servers are the same (step S13). When a different type of DC is installed, DC mis-configuration is detected (step S14), and DC mis-configuration operations are implemented. When all DCs are the same type, all blade servers are activated (step S15).

Next, it is determined whether the type of an I/O module inserted in a specified slot (slot 3, for example) is identical to the DC type (step S16). If not, I/O module mis-configuration is detected (step S17), and I/O module mis-configuration operations are implemented. If so, information of the I/O module type (such as GbE-SW, FC-PT, or IB-PT) is obtained and designated a candidate. I/O type, and the I/O module inserted in slot 3 is activated (step S18). Next, it is determined whether the type of the I/O module inserted in slot 3 is identical to that inserted in slot 4 (step S19). If not, I/O module mis-configuration is detected (step S20), and I/O module mis-configuration operations are implemented. If so, the I/O module inserted in slot 4 is activated (step S21).

Referring to FIG. 3B, when blade servers comprising DCs are not activated, it is determined whether the types of DCs installed on blade servers are the same (step S22). When a different type of DC is detected, chassis mis-configuration is detected (step S23), and chassis mis-configuration operations are implemented. When all DCs are the same type, information of DC type thereof (such as Gbe, FC, or IB) is obtained and the DC type is designated as a candidate I/O type, and the blade servers are activated (step S24). Next, it is determined whether the type of an I/O module inserted in a specified slot (slot 3, for example) is identical to the DC type (step S25). If not, I/O module mis-configuration is detected (step S26), and I/O module mis-configuration operations are implemented. If so, information of the I/O module type (such as GbE-SW, FC-PT, or IB-PT) is obtained and designated a candidate I/O type, and the I/O module inserted in slot 3 is activated (step S27). Next, it is determined whether the type of the I/O module inserted in slot 3 is identical to that inserted in slot 4 (step S28). If not, I/O module mis-configuration is detected (step S29), and I/O module mis-configuration operations are implemented. If so, the I/O module inserted in slot 4 is activated (step S30).

Additionally, if no I/O module is inserted in slot 3 and an I/O module is inserted in slot 4, the I/O module cannot be activated regardless of the I/O module type. If the type of the I/O module inserted in slot 4 is not identical to the DC type, I/O module mis-configuration is detected, and I/O module mis-configuration operations are implemented.

Additionally, in the blade system, if all blade servers comprising DCs are activated and no I/O module is inserted in slots 3 and 4, processes are implemented as follows. If the types of all DCs installed on blade servers are the same, information of the DC type thereof is obtained and the DC type is designated as a candidate I/O type, and steps S11~S30 are then implemented. If no blade servers comprise any DCs, information of the DC type cannot be obtained, and the candidate I/O type is defined as "unknown". If different types of DCs are installed, chassis mis-configuration is detected, and chassis mis-configuration operations are implemented, as shown in FIG. 3A.

Figure 4:
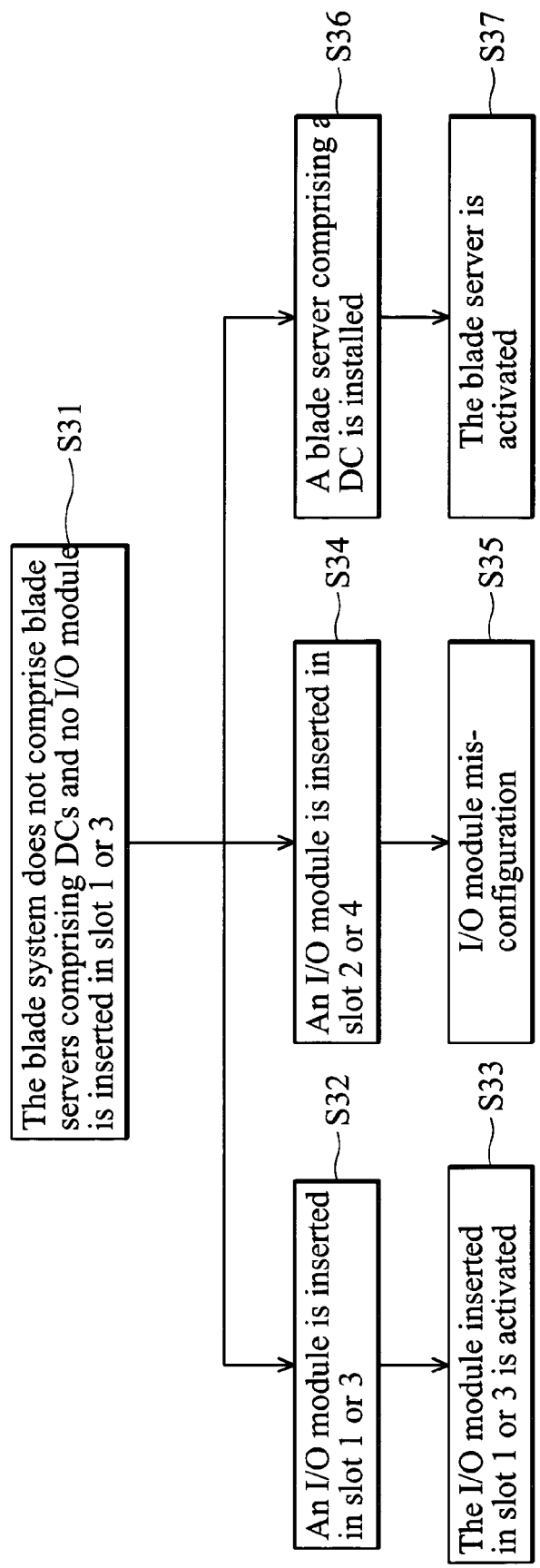
FIG. 4 is a schematic view of another embodiment of a mis-configuration detection method for blade systems.

FIG. 4 is a schematic view of another embodiment of a mis-configuration detection method for blade systems.

Initial states for a blade system are described. The blade system does not comprise blade servers comprising DCs and no I/O module is inserted in slot 1 or 3 (step S31). When an I/O module: is inserted in slot 1 or 3 (step S32), information of I/O module type (such as GbE-SW, FC-PT, or IB-PT) is obtained and the I/O module type is designated as a candidate I/O type, and the I/O module inserted in slot 1 or 3 is activated (step S33). When an I/O module is inserted in slot 2 or 4 (step S34), and no I/O module is inserted in slot 1 or 3, I/O module mis-configuration is detected (step S35), and I/O module mis-configuration operations are implemented. If a blade server comprising a DC is installed (step S36), information of the DC type (such as Gbe, FC, or IB) is obtained, the DC type is designated as a candidate I/O type, and the blade server is activated (step S37).

Figure 5:
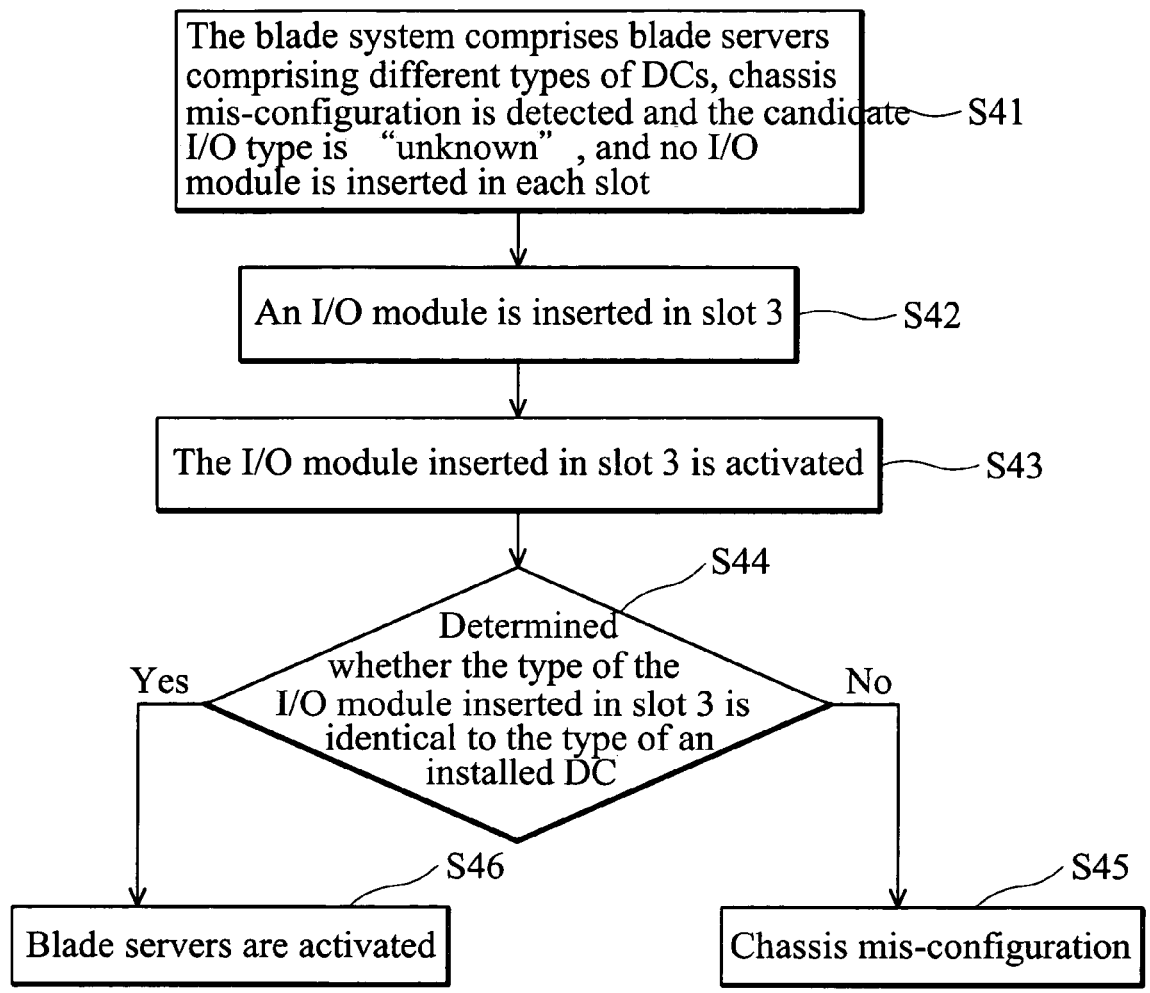
FIG. 5 is a schematic view of a further embodiment of a mis-configuration detection method for blade systems.

FIG. 5 is a schematic view of a further embodiment of a mis-configuration detection method for blade systems.

Initial states for a blade system are described. The blade system comprises blade servers comprising different types of DCs, chassis mis-configuration is detected and the candidate I/O type is "unknown", and no I/O module is inserted in each slot (step S41). When an I/O module is inserted in slot 3 (step S42), information of the I/O module type (such as GbE-SW, FC-PT, or IB-PT) is obtained and the I/O module is activated (step S43). Next, it is determined whether the type of the I/O module inserted in slot 3 is identical to the type of an installed DC (step S44). If not, chassis mis-configuration is detected (step S45). If so, blade servers comprising DCs with the same type to the I/O module type are activated (step S46), and others occur DC mis-configuration.

Based on the flowcharts shown in FIGS. 4 and 5, corresponding operations are described according to limited conditions.

In default setting 1, no DC is installed on each blade server and no I/O module is inserted in slot 1 or 3, the candidate I/O type is "unknown" and no mis-configuration is detected.

If no I/O module is inserted in slot 2 or 4, I/O module mis-configuration is detected when an I/O module is inserted in slot 2 or 4, and I/O module mis-configuration operations are implemented.

If an I/O module is inserted in slot 1 or 3, the I/O module type is designated as a candidate I/O type.

If a blade server comprising a DC is inserted in the blade system, the DC type is designated as a candidate I/O type.

In default setting 2, blade servers comprising different types of DCs are inserted in the blade system and no I/O module is inserted in slot 1 or 3, the candidate I/O type is "unknown" and chassis mis-configuration is detected.

If a blade server comprising a DC is removed, others comprising the same DC type, the DC type is designated as a candidate I/O type, no chassis mis-configuration is detected, and the existing blade servers are activated.

If a blade server comprising a DC is removed, when a blade server comprising a different DC type, chassis mis-configuration is detected.

If an I/O module is inserted in slot 1 or 3, the I/O module type is designated as a candidate I/O type and the I/O module is activated. Blade servers comprising the DC type identical to the candidate I/O type are activated and others remain chassis mis-configuration.

In default setting 3, the blade system comprises blade servers comprising the same DC type which is designated as a candidate I/O type, and no I/O module is installed on slots 1~4.

If an I/O module with the same type to the candidate I/O type is inserted in slot 1 or 3, the I/O module type is designated as a candidate I/O type.

If an I/O module is inserted in slot 2 or 4 and no I/O module is inserted in slot 1 or 3, I/O module mis-configuration is detected regardless of the I/O module type, and I/O module mis-configuration operations are implemented.

If a blade server comprising a DC is removed from the blade system with no blade server installed thereon, the candidate I/O type is classed as "unknown".

If a blade server comprising a DC is removed from the blade system with others existing therein, the candidate I/O type is detected.

If a blade server comprising a DC (the type thereof designated a candidate I/O type) is removed from the blade system with another blade servers comprising the same types of DCs not identical to the candidate I/O type, the DC type is designated as a candidate I/O type.

If a blade server comprising a DC (the type thereof designated a candidate I/O type) is removed from the blade system with all other blade servers comprising different types of DCs, chassis mis-configuration, is detected and the candidate I/O type is classed as "unknown".

If a blade server comprising a different type of DC not identical to the candidate I/O type, DC mis-configuration is detected and DC mis-configuration operations are implemented.

In default setting 4, an I/O module is inserted in slot 3 and the I/O module is designated as a candidate I/O type.

If I/O modules are simultaneously inserted in slots 1 and 2 (3 and 4) and no chassis mis-configuration is detected, the candidate I/O type is detected when I/O modules are removed.

If I/O modules are simultaneously inserted in slots 1 and 2 (3 and 4) and chassis mis-configuration corresponding to one I/O module is detected, the other is removed.

Thus, if the blade system comprises blade servers comprising DCs and activated, the DC type is designated as a candidate I/O type. Further, if the type of an I/O module inserted in slot 3 is identical to the candidate I/O type, the I/O module type is designated as a candidate I/O type. Further, if the type of the I/O module inserted in slot 3 is different from the candidate I/O type, the candidate I/O type is detected. Further, if an I/O module is inserted in slot 4 with none inserted in slot 3, I/O module mis-configuration is detected regardless of the I/O module type, and candidate I/O type is detected.

Based on the described conditions, if the blade system comprises blade servers comprising different types of DCs and inactivated, chassis mis-configuration is detected and the candidate I/O type is classed as "unknown".

Based on the described conditions, if the blade system comprises blade servers comprising the same types of DCs with the DC type not identical to the candidate I/O type, the DC type is re-designated a new candidate I/O type.

Based on the described conditions, the blade system does not comprise any blade servers comprising DCs. Further, if an I/O module is inserted in slot 3, the I/O module type is designated as a candidate I/O type. Further, if an I/O module is inserted in slot 4 with no I/O module inserted in slot 3, I/O module mis-configuration is detected and the is classed as "unknown". Further, if an I/O module is inserted in slot 1 or 2 (3 or 4) and no I/O' module mis-configuration is detected, the inserted I/O module is removed.

Based on the described conditions, if an I/O module is inserted in slot 1 or 2 (3 or 4) and no I/O module mis-configuration is detected, the inserted I/O module is removed, and, if the blade system comprises blade servers comprising different types of DCs and inactivated, chassis mis-configuration is detected and the candidate I/O type is, detected.

Based on the described conditions, if an I/O module is inserted in slot 1 or 2 (3 or 4), the inserted I/O module is removed, and, if the blade system comprises blade servers comprising the same types of DCs with the DC type not identical to the candidate I/O type, the DC type is re-designated a candidate I/O type.

Based on the described conditions, if an I/O module is inserted in slot 1 or 2 (3 or 4), the inserted I/O module is removed, and, if no blade server comprising DCs is installed, the candidate I/O type is classed as "unknown".

Based on the described conditions, if an I/O module is inserted in slot 1 or 2 (3 or 4), an I/O module with the I/O module type not identical to the candidate I/O type is inserted, such that I/O module mis-configuration is detected and I/O module mis-configuration operations are implemented.

Based on the described conditions, if a blade server comprising a DC with the DC type not identical to the candidate I/O type, DC mis-configuration is detected and DC mis-configuration operations are implemented.

A mis-configuration detection method for blade systems of the invention prevent installation of DCs with the DC type not identical to the I/O module type or installation of different types of DCs on blade servers. The method generates notification when erroneous DC or I/O modules are applied, and corresponding controls are implemented.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A mis-configuration detection method for blade systems, comprising:
   providing a blade system, comprising a plurality of blade servers, a first Input/Output (I/O) module, a second I/O module, and a first management module, each blade server comprising a daughter card;
   when the blade system is activated, the first management module determining whether each installed daughter card type is the same;
   if each installed daughter card type is the same, the first management module designating the daughter card type a first candidate I/O type and activating the blade servers, and, if not, daughter card mis-configuration is detected, such that daughter card mis-configuration operations are executed;
   the first management module determining whether the first I/O module type is identical to the first candidate I/O type; and
   if the first I/O module type is identical to the first candidate I/O type, the first management module designating the first I/O module type a second candidate I/O type and activating the first I/O module, and, if not, I/O module mis-configuration is detected, such that I/O module mis-configuration operations are executed.

2. The mis-configuration detection method as claimed in claim 1, further comprising:
   the first management module determining whether the second I/O module type is identical to the second candidate I/O type; and
   if the second I/O module type is identical to the second candidate I/O type, the first management module activating the second I/O module, and, if not, I/O module mis-configuration occurred, executing I/O module mis-configuration operations.

3. The mis-configuration detection method as claimed in claim 1, wherein the daughter card mis-configuration operations comprise unallowable activation for the blade servers, blinking pilot lamp for the blade servers, generation of operation logs, and blinking KVM pilot lamp during activation for the blade servers and generation of error messages.

4. The mis-configuration detection method as claimed in claim 1, wherein the I/O module mis-configuration operations comprise unallowable activation of the I/O modules, blinking pilot lamp for the I/O modules, blinking pilot lamp for chassis of the blade servers, and generation of operation logs.

5. The mis-configuration detection method as claimed in claim 1, further comprising:
   when the blade servers are inactivated, the first management module determining whether each daughter card type is the same;
   if each installed daughter card type is the same, the first management module designating the daughter card type a third candidate I/O type and activating the blade servers, and, if not, chassis mis-configuration is detected, such that chassis mis-configuration operations are executed;
   the first management module determining whether the first I/O module type is identical to the third candidate I/O type; and
   if the first I/O module type is identical to the third candidate I/O type, the first management module designating the first I/O module type a fourth candidate I/O type and activating the first I/O module, and, if not, I/O module mis-configuration is detected, such that I/O module mis-configuration operations are executed.

6. The mis-configuration detection method as claimed in claim 5, further comprising:
   the first management module determining whether the second I/O module type is identical to the fourth candidate I/O type; and
   if the second I/O module type is identical to the fourth candidate I/O type, the first management module activating the second I/O module, and, if not, I/O module mis-configuration is detected, such that I/O module mis-configuration operations are executed.

7. The mis-configuration detection method as claimed in claim 5, wherein the chassis mis-configuration operations comprise blinking pilot lamp for chassis of the blade servers and implementation of daughter card mis-configuration operations for all blade servers comprising a daughter card.

8. The mis-configuration detection method as claimed in claim 1, further comprising providing the blade server with a second management module, wherein the first management module is a master module and the second management module is a slave module, and, when the first management module fails, the second management module changes to the master module.

9. A mis-configuration detection device for blade systems, comprising:
   a plurality of blade servers, each comprising a daughter card;
   a first I/O module, coupled to the blade servers;
   a second I/O module, coupled to the blade servers and the first I/O module;
   a first management module, coupled to the blade servers, the first I/O module, and the second I/O module, when an initial operation is implemented, determining whether each installed daughter card type is the same, if each installed daughter card type is the same, designating the daughter card type a first candidate I/O type and activating the blade servers, and, if not, daughter card mis-configuration is detected, such that daughter card mis-configuration operations are executed, determining whether the first I/O module type is identical to the first candidate I/O type, if the first I/O module type is identical to the first candidate I/O type, designating the first I/O module type a second candidate I/O type and activating the first I/O module, and, if not, I/O module mis-configuration is detected, such that I/O module mis-configuration operations are executed.

10. The mis-configuration detection device as claimed in claim 9, wherein if each installed daughter card type is not the same, daughter card mis-configuration is detected, such that daughter card mis-configuration operations are executed.

11. The mis-configuration detection device as claimed in claim 9, wherein if the first I/O module type is not identical to the first candidate I/O type, I/O module mis-configuration is detected, such that I/O module mis-configuration operations are executed.

12. The mis-configuration detection device as claimed in claim 9, wherein the first management module determines whether the second I/O module type is identical to the second candidate I/O type, and, if so, activates the second I/O module, and, if not, I/O module mis-configuration is detected, such that I/O module mis- configuration operations are executed.

13. The mis-configuration detection device as claimed in claim 9, wherein when the blade servers are inactivated, the first management module determines whether each daughter card type is the same, and, if so, designates the daughter card type a third candidate I/O type and activates the blade servers, if not, chassis mis-configuration is detected, such that chassis mis-configuration operations are executed, determines whether the first I/O module type is identical to the third candidate I/O type, and, if so, the first management module designating the first I/O module type a fourth candidate I/O type and activates the first I/O module, and, if not, I/O module mis-configuration is detected, such that I/O module mis-configuration operations are executed.

14. The mis-configuration detection device as claimed in claim 13, wherein the first management module determines whether the second I/O module type is identical to the fourth candidate I/O type, and, if so, activates the second I/O module, and, if not, I/O module mis-configuration is detected, such that I/O module mis-configuration operations are executed.

15. The mis-configuration detection device as claimed in claim 9, further comprising a second management module, wherein the first management module is a master module and the second management module is a slave module, and, when the first management module fails, the second management module changes to the master module.

* * * * *